United States Patent
Keturakis

(10) Patent No.: US 10,427,100 B2
(45) Date of Patent: Oct. 1, 2019

(54) SORPTION ENHANCED REACTION TECHNOLOGY FOR INCREASED PERFORMANCE FROM AUTOMOTIVE CATALYSTS

(71) Applicant: Cummins Emission Solutions Inc., Columbus, IN (US)

(72) Inventor: Christopher J. Keturakis, Madison, WI (US)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

(21) Appl. No.: 15/972,724

(22) Filed: May 7, 2018

(65) Prior Publication Data
US 2018/0318764 A1  Nov. 8, 2018

Related U.S. Application Data

(60) Provisional application No. 62/502,937, filed on May 8, 2017.

(51) Int. Cl.
*B01D 53/94* (2006.01)
*F01N 3/021* (2006.01)
(Continued)

(52) U.S. Cl.
CPC ....... *B01D 53/9481* (2013.01); *B01D 53/944* (2013.01); *B01D 53/9409* (2013.01); *B01D 53/9418* (2013.01); *F01N 3/021* (2013.01); *F01N 3/0814* (2013.01); *F01N 3/0842* (2013.01); *F01N 3/0871* (2013.01);
(Continued)

(58) Field of Classification Search
CPC .............. B01D 35/005; B01D 46/2418; B01D 53/9409; B01D 53/9413; B01D 53/9427; B01D 2257/404; B01D 2258/012; B01D 53/944; F01N 3/021; F01N 3/035; F01N 3/0814; F01N 3/0821; F01N 3/0842; F01N 3/103; F01N 2240/18; F01N 2250/12; F01N 2570/14
See application file for complete search history.

(56) References Cited

U.S. PATENT DOCUMENTS 1,816,523 A  7/1931  Gluud et al.
6,322,612 B1  11/2001  Sircar et al.
(Continued)

FOREIGN PATENT DOCUMENTS

WO  WO-2008/047170  4/2008

OTHER PUBLICATIONS

Adris, A.M., et al., "The Fluidized Bed Membrane Reactor System: A Pilot Scale Experimental Study," Chemical Engineering Science, vol. 49, No. 24B, pp. 5833-5843, 1994.
(Continued)

Primary Examiner — Timothy C Vanoy
(74) Attorney, Agent, or Firm — Foley & Lardner LLP

(57) ABSTRACT

A method for nitrogen monoxide (NO) oxidation in catalytic systems is disclosed. The method includes receiving NO-containing exhaust gas from an internal combustion engine system, reacting NO with a stoichiometric amount of oxygen gas ($O_2$), the reacting taking place in the presence of a sorbent and a catalyst, and recovering an amount of nitrogen dioxide ($NO_2$) surpassing the equilibrium limitation of the NO oxidation reaction.

13 Claims, 3 Drawing Sheets

(51) Int. Cl.
F01N 3/08 (2006.01)
F01N 3/10 (2006.01)
F01N 3/20 (2006.01)

(52) U.S. Cl.
CPC .......... *F01N 3/0885* (2013.01); *F01N 3/103* (2013.01); *F01N 3/2066* (2013.01); *B01D 2251/2062* (2013.01); *B01D 2251/2067* (2013.01); *B01D 2258/012* (2013.01); *F01N 2570/14* (2013.01)

(56) References Cited

U.S. PATENT DOCUMENTS

| 6,813,884 | B2* | 11/2004 | Shigapov | B01D 53/9418 60/274 |
| 8,695,329 | B2* | 4/2014 | Mussmann | B01D 53/9477 60/295 |
| 2013/0336865 | A1 | 12/2013 | Brisley et al. | |
| 2015/0158019 | A1 | 6/2015 | Rajaram et al. | |

OTHER PUBLICATIONS

Alpay, E., et al., "Combined Reaction and Separation in Pressure Swing Processes," Chemical Engineering Science, vol. 49, No. 24B, pp. 5845-5864, 1994.
Alpay, E., et al., "Simulation of Rapid Pressure Swing Adsorption and Reaction Processes," Chemical Engineering Science, vol. 48, No. 18, pp. 3173-3186, 1993.
Armor, J.N. "Membrane Catalysis: Where is it now, what needs to be done?", Catalysis Today 25 (1995), pp. 199-207.
Beaver, M.G., et al., "Sorption enhanced reaction process for direct production of fuel-cell grade hydrogen by low temperature catalytic steam-methane reforming," Journal of Power Sources, 195, (2010), pp. 1998-2002.
Brun-Tsekhovoi, A.R., et al., "The Process of Catalytic Steam-Reforming of Hydrocarbons in the Presence of Carbon Dioxide Acceptor," Hydrogen Energy Process VII, Proc. World Hydrogen Energy Conf., Pergamon Press: New York, 1986, vol. 2, p. 885.
Carvill, B.T., et al., "Sorption-Enhanced Reaction Process," AIChE J. 1996, 42(10), pp. 2765-2772.
Chatsiriwech, D., et al., "Enhancement of Catalytic Reaction by Pressure Swing Adsorption," Catalysis Today 20 (1994), pp. 351-366.
Cho, B.K., et al., "A Continuous Chromatographic Reactor," Chemical Engineering Science, vol. 35, 1980, pp. 74-81.
Cho, B.K., et al., "The Mathematical Theory of a Countercurrent Catalytic Reactor," Mathematical, Physical & Engineering Sciences, 1982, 383, pp. 147-189.
Chu, C., et al., "Behavior of a Chromatographic Reactor," Ind. Eng. Chem. Process Des Dev. 1971, 10 (1), pp. 47-53.
Fish, B., et al., "The Continuous Countercurrent Moving Bed Chromatographic Reactor," Chemical Engineering Science, vol. 41, No. 4, pp. 661-668, 1986.
Goto, S., et al., "Dehydrogenation of Cyclohexane in a PSA Reactor Using Hydrogen Storage Alloy," Chem. Eng. Essays, Japan, 1993, 19(6), pp. 978-983 (English abstract).
Han, C., et al., "Simultaneous Shift Reaction and Carbon Dioxide Separation for the Direct Production of Hydrogen," Chemical Engineering Science, vol. 49, No. 24B, pp. 5875-5883, 1994.
Hufton, J.R., et al., "Sorption-Enhanced Reaction Process for Hydrogen Production," AIChE J. 1999, 45, pp. 248-256.
Itoh, N., et al., "Capability of Permeate Hydrogen through Palladium-Based Membranes for Acetylene Hydrogenation," Ind. Eng. Chem. Res. 1993, 32 (11), pp. 2614-2619.
Kirkby, N.F., et al., "A Theoretical Investigation of Pressure Swing Reaction," Trans. Inst. Chem. Eng., 1994, 72, pp. 541-550.
Kruglov, A.V., "Methanol Synthesis in a Simulated Countercurrent Moving-Bed Adsorptive Catalytic Reactor," Chemical Engineering Science, vol. 49, No. 24A, pp. 4699-4716, 1994.
Lee, B.L., et al., "Reversible Chemisorbents for Carbon Dioxide and Their Potential Applications," Ind. Eng. Chem. Res. 2008, 47, pp. 8048-8062.
Lee, I.D., et al., Effects of Adsorbent and Catalyst Distributions in Pressure Swing Reactors, AIChE Symp. Ser., 1989, 84, p. 167.
Lee, K.B., et al., "Chemisorption of Carbon Dioxide on Sodium Oxide Promoted Alumina," AIChE J. 2007, 53, pp. 2824-2831.
Lee, K.B., et al., "Performance of Na2O promoted alumina as CO2 chemisorbent in sorption-enhanced reaction process for simultaneous production of fuel-cell grade H2 and compressed CO2 from synthesis gas," Journal of Power Sources, 176, (2008, pp. 312-319.
Lee, K.B., et al., "Reversible chemisorption of carbon dioxide: simultaneous production of fuel-cell grade H2 and compressed CO2 from synthesis gas," Adsorption (2007), 13: pp. 385-397.
Lu, Z.P., et al., "Pressure Swing Adsorption Reactors: Simulation of Three-Step One-Bed Process," AIChE J. 1994, 40(7), pp. 1118-1137.
Magee, E., "The Course of a Reaction in a Chromatographic Column," Ind. Eng. Chem. Fundamentals, 1963, 2 (1), pp. 32-36.
Petroulas, T., et al., "Analysis and Performance of a Countercurrent Moving-Bed Chromatographic Reactor," Chemical Engineering Science, vol. 40, No. 12, pp. 2233-2240, 1985.
Roginskii, S.Z., et al., "Catalytic Reactions and Catalysis Under Chromatographic Conditions," Kinet Katal., 1962, 3, p. 529.
Sun, Y., et al., "Catalytic Membrane for Simultaneous Chemical Reaction and Separation Applied to a Dehydrogenation Reaction," Ind. Eng. Chem. Res. 1988, 27, pp. 1136-1142.
Takeuchi, K., et al., "Experimental Studies of a Chromatographic Moving-Bed Reactor," J. Chem. Eng. Japan, 1977, 10 (6), pp. 455-460.
Tonkovich, A.L., et al., "A Simulated Countercurrent Moving-Bed Chromatographic Reactor for the Oxidative Coupling of Methane: Experimental Results," Chemical Engineering Science, vol. 49 (24), No. 24A, pp. 4647-4656, 1994.
Tsotsis, T., et al., "Packed Bed Catalytic Membrane Reactors," Chemical Engineering Science, vol. 47, No. 9-11, pp. 2903-2908, 1992.
Uemiya, S., et al., "The Water Gas Shift Reaction Assisted by a Palladium Membrane Reactor," Ind. Eng. Chem. Res. 1991, 30 (3), pp. 585-589.
Vaporciyan, G.G., et al., "Equilibrium-Limited Periodic Separating Reactors," AIChE J. 1987, 33 (8), pp. 1334-1343.
Vaporciyan, G.G., et al., "Periodic Separating Reactors: Experiments and Theory," AIChE J. 1989, 35(5), pp. 831-844.
Waldron, W.E., et al., "Production of Hydrogen by Cyclic Sorption Enhanced Reaction Process," AIChE J. 2001, 47 (6), pp. 1477-1479.
Wu, J., et al. "Dehydrogenation of Ethylbenzene to Styrene Using Commercial Ceramic Membranes as Reactors," Separation Science and Technology, 1990, 25 (13-15), pp. 1489-1510.

* cited by examiner

SORPTION ENHANCED REACTION TECHNOLOGY FOR INCREASED PERFORMANCE FROM AUTOMOTIVE CATALYSTS

CROSS-REFERENCE TO RELATED APPLICATIONS

This application claims priority to U.S. Provisional Patent Application No. 62/502,937, filed on May 8, 2017 and the contents of which are herein incorporated by reference in their entirety and for all purposes.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to a method for nitrogen monoxide (NO) oxidation in a catalytic system. The method includes receiving NO-containing exhaust gas from an internal combustion engine system, reacting NO with a stoichiometric amount of oxygen gas ($O_2$), the reacting taking place in the presence of a sorbent and a catalyst, and recovering an amount of nitrogen dioxide ($NO_2$) surpassing the equilibrium limitation of the NO oxidation reaction.

In one implementation, the sorbent selectively adsorbs $NO_2$. In one implementation, the method further includes periodically regenerating the sorbent. In another implementation, the method further includes continuously regenerating the sorbent.

In one implementation, the method further includes suppressing the reverse reaction of $NO_2$ to form NO and $O_2$. In one implementation, the presence of the sorbent and catalyst allows for higher conversions of NO than when no sorbent is present.

DETAILED DESCRIPTION

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for aftertreatment of internal combustion engines. The various concepts introduced above and discussed in greater detail below may be implemented in any of numerous ways, as the described concepts are not limited to any particular manner of implementation. Examples of specific implementations and applications are provided primarily for illustrative purposes.

Overview

In some exhaust systems, a sensor module may be located downstream of an SCR catalyst to detect one or more emissions in the exhaust flow after the SCR catalyst. For example, a $NO_x$ sensor, a CO sensor, and/or a particulate matter sensor may be positioned downstream of the SCR catalyst to detect $NO_x$, CO, and/or particulate matter within the exhaust gas exiting the exhaust of the vehicle. Such emission sensors may be useful to provide feedback to a controller to modify an operating parameter of the aftertreatment system of the vehicle. For example, a $NO_x$ sensor may be utilized to detect the amount of $NO_x$ exiting the vehicle exhaust system and, if the $NO_x$ detected is too high or too low, the controller may modify an amount of reductant delivered by a dosing module. A CO and/or a particulate matter sensor may also be utilized.

Overview of Aftertreatment System

Figure 1:
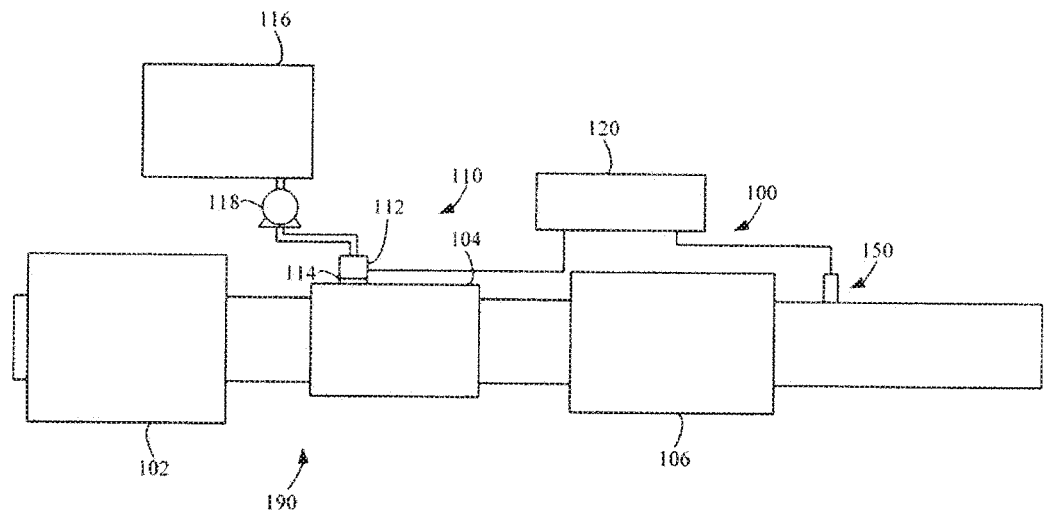
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor pipe 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating (SDPF). In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or six sensors 150, with each sensor 150 located at one of the foregoing positions of the exhaust system 190.

Combination of Catalysts with Selective Sorbent Material

Combining existing catalysts (namely automotive catalysts) with selective sorbent materials in one catalyst bed allows for several potential benefits. For example, thermodynamic equilibriums of catalytic reactions may be exceeded, conversion efficiency may be increased, and the catalytic aftertreatment system may become more resilient to rapid changes in engine exhaust.

In one implementation, a mixture of sorbent and catalyst is blended in a reactor. For reversible reactions (e.g., $A \leftrightarrows B$), the sorbent selectively removes at least one reaction product by either physical or chemical adsorption to thereby increase the forward reaction rate. As a result, equilibrium limitations are exceeded because by removing the reaction product, the reverse reaction in a reversible system (e.g., $B \rightarrow A$) is suppressed, and the system increases the rate of the forward reaction ($A \rightarrow B$) in an attempt to regain equilibrium. The sorbent may then be periodically or continuously regenerated using different designs such as pressure-swing adsorption, thermal swing adsorption, moving-bed reactors, and like mechanisms. The catalyst has no effect on equilibrium, but may be used to increase the reaction rate of the forward reaction. This particular process is called a Sorption Enhanced Reaction (SER).

In another example of the SER process, mixtures of catalysts and sorbents are utilized in automotive catalytic converters. The use of SERs in automotive catalytic converter applications has many benefits, including (1) surpassing equilibrium limitations to allow for higher conversions at high temperatures, (2) enhanced conversions at low temperature by suppression of reverse reactions, (3) increased system robustness by resisting changes in system states (e.g., temperature, pressure, concentrations, etc.), and (4) system cost reduction due to the need for less catalyst. Each benefit is described in greater detail below.

Figure 2:
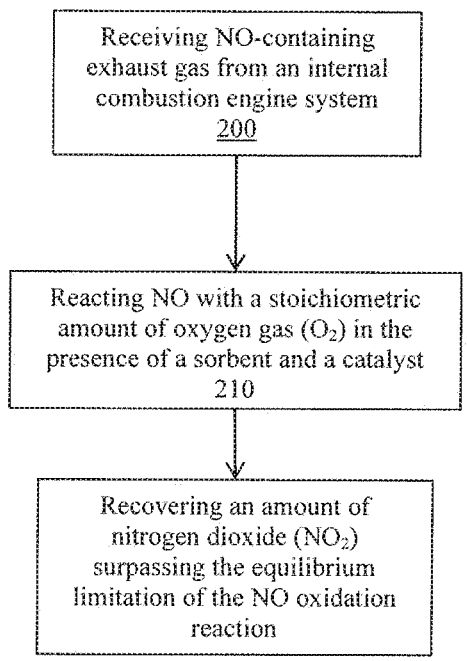
FIG. 2 is a flow chart illustrating a Sorption Enhanced Reaction process according to one implementation of the present disclosure.

FIG. 2 shows a flow chart of a Sorption Enhanced Reaction (SER) process according to one implementation of the present disclosure. The process includes receiving NO-containing exhaust gas from an internal combustion engine system (200), reacting NO with a stoichiometric amount of oxygen gas ($O_2$), the reacting taking place in the presence of a sorbent and a catalyst (210), and recovering an amount of nitrogen dioxide ($NO_2$) surpassing the equilibrium limitation of the NO oxidation (220).

Surpassing Equilibrium Limitations to allow for Higher Conversions at High Temperatures Catalytic converter chemistry involves reversible reactions that are equilibrium limited at high temperatures, such as NO oxidation ($NO + \frac{1}{2}O_2 \leftrightarrows NO_2$) and $SO_2$ oxidation ($SO_2 + \frac{1}{2}O_2 \leftrightarrows SO_3$). To overcome the equilibrium limitation for NO oxidation, a sorbent is added to selectively adsorb $NO_2$. By selectively removing $NO_2$ (adsorbing on sorbent), the reverse reaction ($NO_2 \rightarrow NO + \frac{1}{2}O_2$) is suppressed and the forward reaction ($NO + \frac{1}{2}O_2 \rightarrow NO_2$) is enhanced in an attempt to recalibrate at equilibrium. The sorption-enhanced NO oxidation continues until the sorbent reaches its full $NO_2$ capacity, at which point, NO oxidation reverts to its equilibrium limit. Like catalysts, sorbents may be regenerated in response to heat treatments or changes, pressure changes, or other similar external stimuli, thus allowing for nearly continuous sorption enhanced reactions.

In SER mechanisms, the primary purpose of the sorbent is to capture only the product of the reversible reaction for exceeding the reaction equilibrium limitation and resulting in higher reactant conversions. By capturing only the product, the reverse reaction is prevented (i.e. $NO_2$ back to NO) while the forward reaction is enhanced (equilibrium breaking). Traditional sorption technologies (i.e. lean $NO_x$ trap (LNT)/diesel cold start Catalyst or diesel cold start concept (dCSC) sorption) are not selective to only the product, meaning that both NO and $NO_2$ are captured (i.e. $NO_x$). As a result, less reactant (i.e. NO) is available to convert into product ($NO_2$). In other words, traditional automotive sorption technologies cannot exceed equilibrium limitations because both reactant and product are captured, preventing both forward and reverse reactions.

EXAMPLE 1

Figure 3:
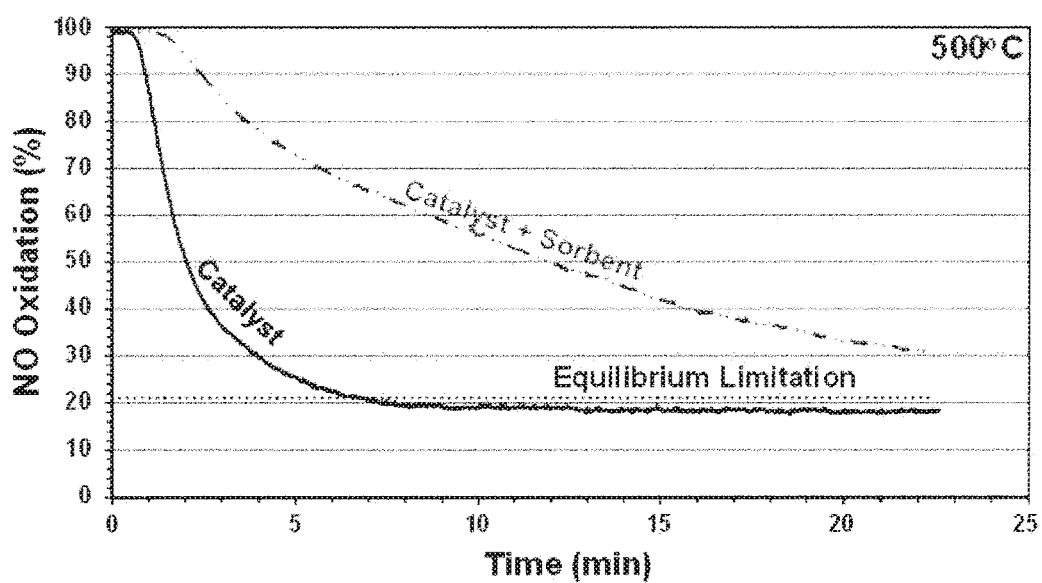
FIG. 3 illustrates nitrogen monoxide (NO) oxidation performed at 500° C. using a standard diesel oxidation catalyst and a mixture of catalyst and sorbent (~1:3 wt. ratio of catalyst to sorbent). The reaction feed comprises 200 ppm NO, 10% $O_2$, argon balance.

FIG. 3 illustrates nitrogen monoxide (NO) oxidation performed at 500° C. using a standard diesel oxidation catalyst and a mixture of the same diesel oxidation catalyst with a $NO_2$ sorbent (~1:3 wt. ratio of catalyst to sorbent). The reaction feed comprises 200 ppm NO, 10% $O_2$, argon balance. As is shown, the diesel oxidation catalyst (labeled "Catalyst") quickly drops to an equilibrium limit of ~20% conversion within 8 mins while the catalyst and sorbent mixture (labeled "Catalyst+Sorbent") maintains conversions well above the equilibrium limit for the entire observed time frame. Thus, by selectively removing $NO_2$, the catalyst-sorbent is able to demonstrably surpass equilibrium limitations (e.g., 20% in this example) for NO oxidations to allow for higher conversions at high temperatures. Currently, no approaches exist in the automotive industry that allow for exceeding the equilibrium limitations of the catalytic converter chemistry.

Enhanced Conversions at Low Temperature by Suppression of Reverse Reactions. As mentioned above, sorbents may greatly suppress reverse reactions by removing products from the reaction zone as they are produced. As a result, forward reactions are enhanced in an attempt to balance out the system and reach an equilibrium. This enhancement also occurs even when equilibrium limitations are not limiting, i.e. at low temperatures.

Increased System Robustness by Resisting Changes in System States (Temperature, Pressure, Concentrations, etc.). Because a sorbent adsorbs and desorbs molecules selectively, the entire system is capable of resisting sudden changes in system variables that might affect the concentration of a target molecule (e.g., $NO_2$). In these instances, the sorbent has not reached its full sorption capacity.

EXAMPLE 2

Figure 4:
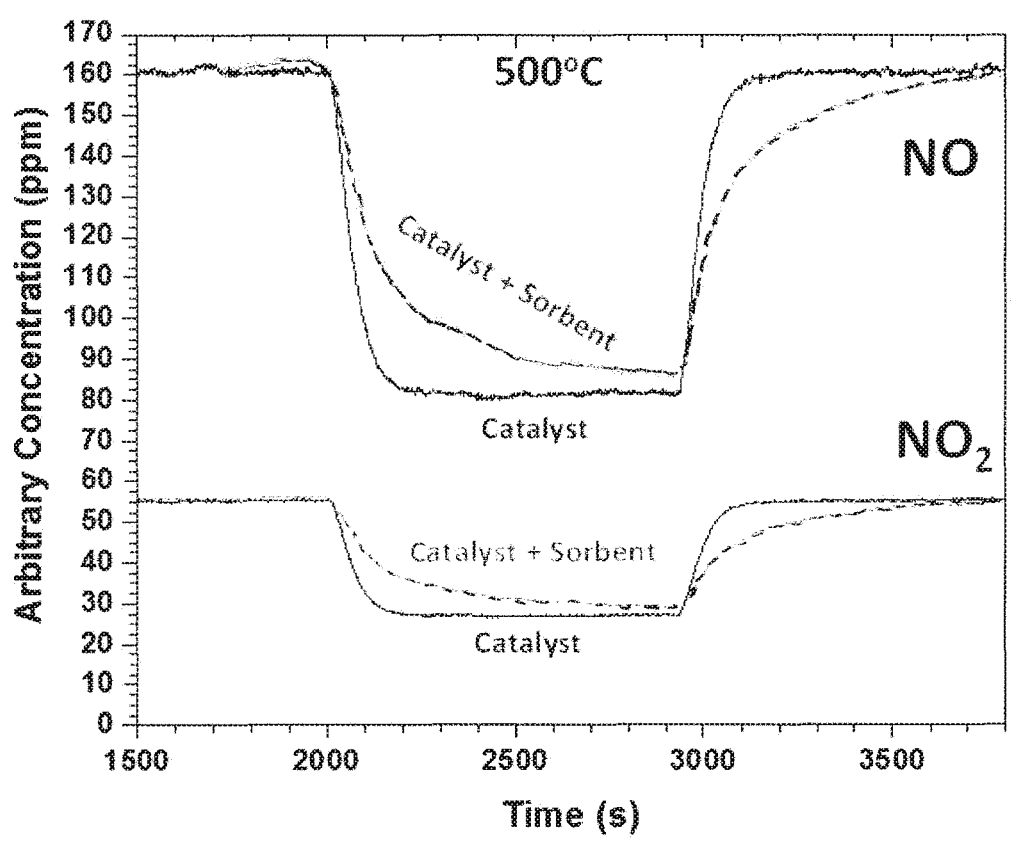
FIG. 4 illustrates NO oxidation performed at 500° C. using a standard diesel oxidation catalyst and a mixture of catalyst and sorbent (~1:3 wt. ratio of catalyst to sorbent). The reaction feed comprises 'x' ppm NO, 10% $O_2$, argon balance.

FIG. 4 illustrates NO oxidation performed at 500° C. using a standard diesel oxidation catalyst and a mixture of the same diesel oxidation catalyst with a $NO_2$ sorbent (~1:3 wt. ratio of catalyst to sorbent). The reaction feed comprises 'x' ppm NO, 10% $O_2$, argon balance. System robustness is observed in the event of concentration drops or increases. NO oxidation is performed at 500° C. and allowed to reach steady state conversion (i.e. NO concentration equals about 160 ppm; $NO_2$ concentration equals about 55 ppm) before the concentration of NO is reduced by about 50%. The transient NO and $NO_2$ concentration is shown as a function of time and demonstrates that the catalyst quickly reaches a new steady state (at a NO concentration of about 80 ppm and a $NO_2$ concentration of about 30 ppm) while the catalyst and sorbent mixture more slowly responds to the change of NO concentration. As the NO concentration is doubled at about ~3000 seconds, the catalyst once again quickly responds to reach a new steady state at the original NO concentration of about 160 ppm and a $NO_2$ concentration of about 55 ppm. The catalyst and sorbent mixture again more slowly responds to the change of NO concentration. This is because when gas concentrations decrease, the sorbent releases adsorbed/stored molecules to balance out the concentration change; the opposite behavior occurs when gas concentrations are increased. This allows the overall system to resist sudden concentration changes.

EXAMPLE 3

One potential application for exploiting this catalyst-sorbent technology is by coupling a diesel oxidation catalyst with a $NO_2$ sorbent, as demonstrated in the above examples. Based on FIGS. 2 and 3, the combination of a diesel oxidation catalyst with a $NO_2$ sorbent will increase NO conversion significantly, beyond equilibrium limitations at high temperatures, and act as a chemical buffer to resist sudden changes in engine out $NO_x$. The enhanced NO conversion to $NO_2$ at low temperatures may also help facilitate low temperature "Fast SCR" downstream.

System Cost Reduction due to the Need for Less Catalyst. As automotive emissions standards become stricter, most current catalytic technologies involve catalyst improvement, new catalyst development, or an increase in catalyst volume. As demonstrated above, mixing a sorbent with a catalyst to perform a SER allows for higher conversions than with a catalyst alone. Thus, the use of expensive catalysts may be reduced by replacing a portion of the catalyst with a sufficient amount of sorbent required to achieve a target conversion. Sorbents are often made out of cheaper, non-precious materials than precious metal catalysts, such as aluminum oxides, alkali metal oxides, or naturally occurring minerals such as hydrotalcites. In this manner, less expensive sorbent materials enable lower cost and higher performance systems than currently available.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. For example, while the use of this technology is exemplified for NO oxidations in automotive catalytic converters, it should be understood that the present disclosure is not limited to this reaction and application. Rather NO oxidations in automotive catalytic converters is merely one embodiment meant to exemplify any automotive chemical reactions. It should also be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A aftertreatment system for an engine, the aftertreatment system comprising:
    a diesel particulate filter;
    a decomposition chamber;
    a dosing module configured to dose reductant into the decomposition chamber; and
    a catalyst component configured for nitrogen monoxide (NO) oxidation, the catalyst component being configured to receive a flow of NO-containing exhaust gas produced by the engine, to react the NO-containing exhaust gas with an amount of oxygen gas ($O_2$) in a presence of a sorbent and a catalyst, wherein the sorbent is adapted to adsorb an amount of nitrogen dioxide ($NO_2$) to exceed an equilibrium limitation of an NO oxidation reaction for the NO-containing exhaust gas.

2. The system of claim 1, wherein a weight ratio of the catalytic material to the sorbent in the catalyst component is approximately 1:3.

3. The system of claim 1, wherein the catalyst component is a diesel oxidation catalyst component.

4. The system of claim 1, wherein the sorbent is adapted to suppress a reverse reaction of $NO_2$ to NO and $O_2$.

5. The system of claim 1, wherein the sorbent is adapted to increase a rate of a forward reaction in a reversible reaction.

6. The system of claim 5, wherein the sorbent is adapted to increase the rate of formation of $NO_2$.

7. The system of claim 1, wherein the sorbent is adapted to capture $NO_2$ without capturing NO.

8. A method for nitrogen monoxide (NO) oxidation in a catalytic system, the method comprising:
   receiving a NO-containing exhaust gas produced by an engine at a catalyst component;
   reacting the NO-containing exhaust gas with an amount of oxygen gas ($O_2$) in a presence of a sorbent and a catalyst in the catalyst component; and
   adsorbing an amount of nitrogen dioxide ($NO_2$) with the sorbent to exceed an equilibrium limitation of an NO oxidation reaction for the NO-containing exhaust gas.

9. The method of claim 8, further comprising periodically regenerating the sorbent.

10. The method of claim 8, further comprising continuously regenerating the sorbent.

11. The method of claim 8, further comprising suppressing a reverse reaction of $NO_2$ to NO and $O_2$.

12. The method of claim 8, wherein the catalyst component is a diesel oxidation catalyst component.

13. The method of claim 8, wherein NO-containing exhaust gas entering the catalyst component is at a temperature of 500° C.

\* \* \* \* \*